United States Patent

Snell

[11] Patent Number: 4,631,486
[45] Date of Patent: Dec. 23, 1986

[54] M-PHASE PSK VECTOR PROCESSOR DEMODULATOR

[75] Inventor: James L. Snell, Palm Bay, Fla.

[73] Assignee: Harris Corporation, Melbourne, Fla.

[21] Appl. No.: 718,285

[22] Filed: Apr. 1, 1985

[51] Int. Cl.$^4$ .................. H03D 3/06; H03D 3/18
[52] U.S. Cl. ................................. 329/50; 329/110; 375/83; 375/94
[58] Field of Search ............... 329/50, 110, 122, 124; 375/52, 53, 54, 56, 83, 84, 85, 86, 87, 94

[56] References Cited

U.S. PATENT DOCUMENTS 3,675,129  7/1972  Melvin .................................. 375/84

Primary Examiner—Eugene R. LaRoche
Assistant Examiner—James C. Lee
Attorney, Agent, or Firm—Antonelli, Terry & Wands

[57] ABSTRACT

A technique for deriving a phase reference for PSK demodulation uses the absolute values of phase vectors as they are received to establish a reference with which the individual phase vectors are compared for data demodulation. Over some span of N successively received signals (phase vectors), the received phase vectors are successively analyzed to derive a hypothetical reference phase vector with which the vector symbols are to subsequently compared for data demodulation. The symbol values are temporarily buffered as they are received. As each phase vector is received, all possible (i.e. M-ary) phase values, referenced to the value of the received phase vector, are compared to a stored reference. Each of these M-ary possible phase values is vector-summed with the stored reference and the resulting vector sum having the largest magnitude is then substituted for the stored reference and is used by the next received vector symbol to further refine the reference vector. This process is carried out successively for each of the received phase vector of the N-symbol span, at the completion of which the successively refined value of the stored reference vector is used to demodulate the previously received and buffered N symbols of the span of interest.

45 Claims, 8 Drawing Figures

M-PHASE PSK VECTOR PROCESSOR DEMODULATOR

FIELD OF THE INVENTION

The present invention is directed in general to communication systems, and is particularly directed to a scheme for deriving a phase reference to be employed for M-ary PSK demodulation.

BACKGROUND OF THE INVENTION

M-phase or M-ary PSK signalling is a modulation technique commonly employed in both continuous and burst communication systems. At the receiver, data, that has been originally quantized into one of M levels and transmitted at some $i^{th}$ phase angle $\theta$, where $0 \leq \theta \leq M$, relative to a reference angle $\theta_{REF}$, is recovered through the use of a reference phase generator by comparing successively received symbols with the reference. Typically, the generation of the phase reference is accomplished through the use of a closed (phase-lock) loop. In a closed loop system it is necessary to have a continuously available signal in order for the receiver to "lock-on" to the reference with which unknown data symbol-representative phase vectors are to be compared. As a result, where the data transmission is in a burst format the closed loop system is subjected to a substantial loss of data as it must reacquire the reference for each burst. Moreover, in any locking loop scheme there is a certain amount of data loss during the acquisition (locking) interval.

SUMMARY OF THE INVENTION

In accordance with the present invention there is provided a new and improved technique for deriving a phase reference for PSK demodulation that uses the absolute values of phase vectors as they are received to establish a reference with which the individual phase vectors are compared for data demodulation. For this purpose, over some span of N successively received signals (phase vectors), the received phase vectors are successively analyzed to derive a hypothetical reference phase vector with which the vector symbols are to be subsequently compared for data demodulation. To accommodate the length of the symbol span over which the present invention operates to refine a reference vector to be used to demodulate each successive symbol value, the symbol values are temporarily buffered as they are received.

In the process of determining the reference vector, as each phase vector is received, all possible (i.e. M-ary) phase values, referenced to the value of the received phase vector, are compared to a stored reference. Each of these M-ary possible phase values is vector-summed with the stored reference and the resulting vector sum having the largest magnitude is then substituted for the stored reference and is used by the next received vector symbol to further refine the reference vector. This process is carried out successively for each of the received phase vectors of the N-symbol span, at the completion of which the successively refined value of the stored reference vector is used to demodulate the previously received and buffered N symbols of the span of interest. For successive symbol spans the process is repeated, each span using only the vector symbols in that span in the reference vector selection and refinement process.

Because the process through which the reference vector is chosen is dependent upon information contained exclusively in those symbols to be demodulated and because the reference is redefined for each successive symbol span, the scheme is both dynamically adaptive and effectively minimizes loss of data.

DETAILED DESCRIPTION

Figure 1:
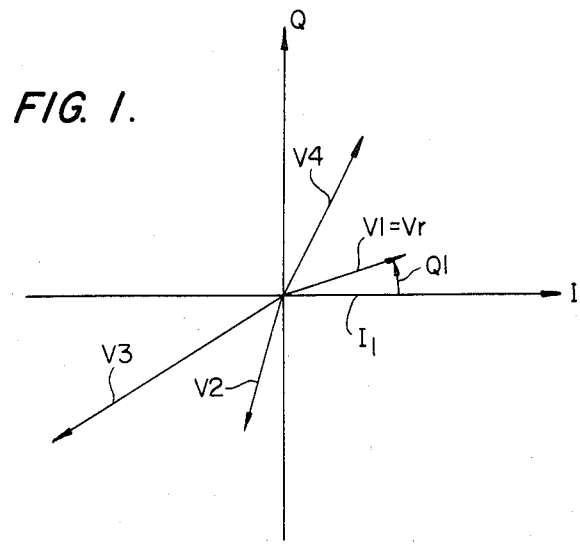
FIGS. 1-6 are respective phase vector diagrams for illustrating the reference vector selection and refinement process of the present invention carried out for BPSK modulation over a span of N=4 symbols.

Before describing, in detail, the particular improved phase reference generation scheme for M-ary PSK vector demodulation in accordance with the present invention, it should be observed that the invention resides primarily in a novel structural combination of conventional communication circuits, and not in the particular detailed configurations thereof. Accordingly, the structure, control and arrangement of the circuit components have been illustrated in the Drawings by conventionally employed and readily understandable block representation, in order not to obscure the disclosure with circuit details which will be readily apparent to those skilled in the art having the benefit of the description herein.

Figure 7:
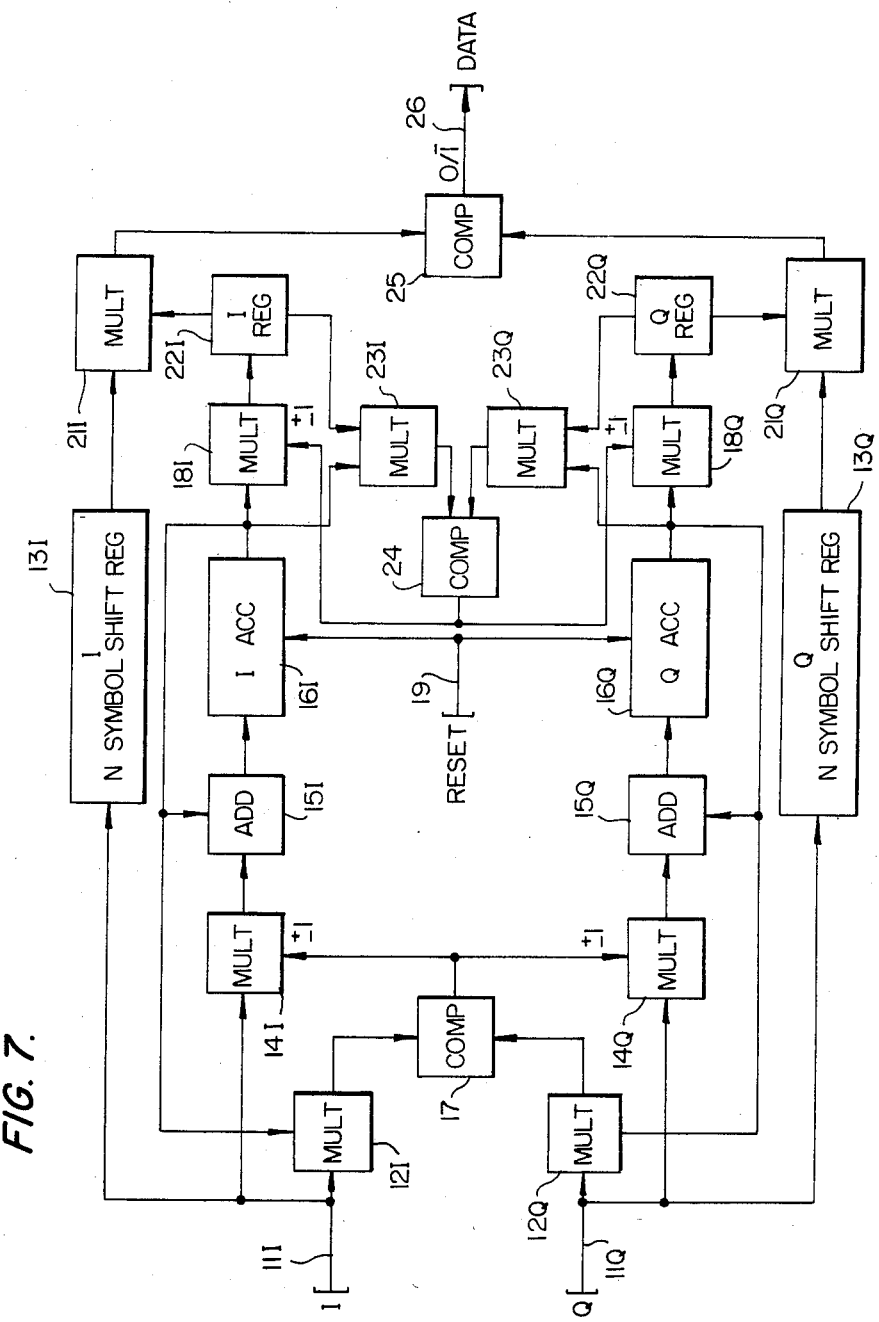
FIG. 7 is a schematic block diagram of a BPSK reference vector generator/demodulator in accordance with the present invention.

In order to facilitate an understanding of the configuration and operation of the invention, a schematic block diagram of which is shown in FIG. 7 to be described in detail below, an explanation of the characteristics of M-ary (or M-phase) PSK modulated signals will initially be presented. This explanation will be followed by a detailed description of the configuration and operation of an embodiment of the invention, illustrated in FIG. 7, as applied to a particular form of M-ary PSK modulation, specifically where M=2, or binary PSK modulated signals.

By M-ary PSK modulation is meant its ordinary usage in the art, specifically a data symbol is encoded or representable as one of M-phases (relative to a reference phase) of a constant frequency signal. At the receiver, this means that each particular symbol to be recovered is represented by some absolute phase relative to a reference vector. Because, at the receiver, the reference vector is unknown, and because the phase of each symbol is subject to variation or shift during its transmission, an initial task of the receiver is to determine the reference vector against which each received phase vector is to be compared, and then derive, from the absolute value of each received phase vector, corresponding to each respective symbol, the actual phase that was transmitted so as to thereby recover the original data.

As mentioned briefly above, this has been conventionally accomplished through the use of a (phase lock) loop approach for generating a phase reference, the loop basically employing the information contained in previously received symbols and then demodulating the next received symbol based upon this previously derived information. It will be recognized that the demodulation process is similar to differential PSK modulation, DPSK employing the phase difference between two adjacent symbols to indicate a bit decision (for digital data).

In accordance with the present invention, the absolute phase values of a plurality N of successively received symbols are used to establish, for each symbol, M hypothetical phase values that may have been originally transmitted. (Namely, the absolute phase of the received vector establishes a reference vector Vr from which to define each hypothetical phase vector Vm.) Each of these hypothetical phase vectors Vm is then vector-summed with the reference phase vector $V_r$ to produce M vector sums Vsm. That vector sum Vsm whose magnitude Hm is largest $Hm_{max}$ is chosen as the new reference vector $V_r$. This process is repeated over the N symbols and the final reference vector is then used to demodulate all N symbols. At the completion of the demodulation of all N symbols, the process is begun anew with a new set of N received symbols.

To illustrate the manner in which a group of M hypotheses may be defined for any received M-ary PSK phase vector, consider the definition of an individual phase vector. Using a cylindrical coordinate system, a phase vector may be generally denoted as (V, θ), where V is amplitude and θ is phase angle. Using the customary in-phase (I) and quadrature-phase (Q) representation of the vector, the respective I and Q components may be defined as follows:

$I = V \cos \theta$, and $Q = V \sin \theta$.

Since PSK modulation involves the shifting of the phase vector by some number α (in radians), the I and Q components of a phase-shifted (θ+α) vector becomes $I' = V \cos(\theta + \alpha)$ $Q' = V \sin(\theta + \alpha)$ or, in terms of the original in-phase and quadrature components, $I' = I \cos \alpha - Q \sin \alpha$, and $Q' = I \sin \alpha + Q \cos \alpha$.

For M-ary PSK modulation, each value of α corresponds to some multiple of a fractional phase shift from the original angle θ, defined in terms of M; i.e. (θ+α) takes on one of the values 0, 2π/M, 2(2π)/M, 3(2π)/M . . . (M−1)(2π)/M, or (θ+α)=2mπ/M, where $0 \leq m \leq M-1$, m and M being integers. Thus, the respective quadrature components of a respective M-ary PSK vector Vm may be defined in terms of the original vector components as:

$Im = I \cos(2\pi m)/M - Q \sin(2\pi m)/M$, and $Qm = I \sin(2\pi m)/M + Q \cos(\pi m)/M$.

As described above, according to the signal processing scheme of the present invention, a plurality of hypotheses of vector sums Vsm are generated for each received phase vector. Each hypothesis Hm is the magnitude of the vector sum Vsm of reference vector Vr and one of the M possible phases of the received vector.

For M-ary PSK modulation a respective hypothesis Hm may thus be defined as $Hm = ((Im + Ir)^2 + (Qm + Qr)^2)^{\frac{1}{2}}$, where Ir, Qr are the respective in-phase and quadrature components of the reference vector, Im and Qm are the components of a respective hypothetical vector Vm, as defined above, and $1 \leq m \leq M$. Once the largest magnitude $|Hm|_{max}$ has been found, the reference vector Vr=(Ir,Qr) is replaced by a new reference vector $Vr' = (Ir + Im_{|Hm|max}, Qr + Qm_{|Hm|max})$.

This process is then repeated for each successively received phase vector over the span of N symbols so as to successively refine the make-up of the reference vector. Then the N symbols of the sequence are demodulated using the eventually defined reference vector.

To provide an illustrate example of the above process, attention is directed to FIG. 1 which shows a phase vector diagram for a set of four received phase vectors $V_1 \ldots V_4$. In the following description, it will be assumed that the type of M-ary modulation employed is binary PSK, (M=2). Moreover, the symbol span (N) to be used will correspond to the four vectors shown in FIG. 1 (namely, N=4). For phase vector V1 in FIG. 1, the respective in-phase and quadrature components I1 and Q1 are shown. The in-phase and quadrature components for the other phase vectors V2, V3, V4 are not illustrated in order to simplify the drawing.

Figure 2:
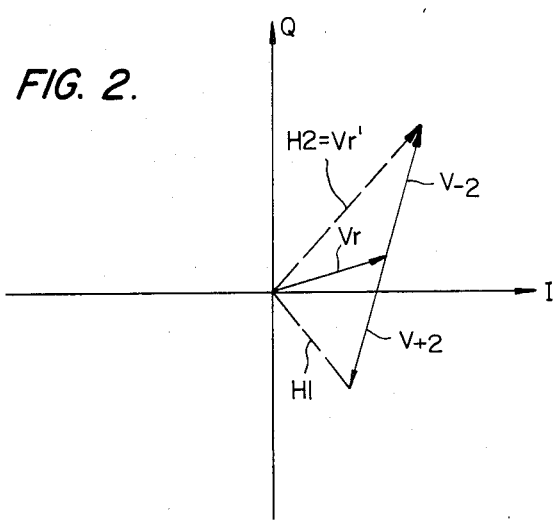

At the start of the analysis process, it is assumed that phase vector V1 is the phase vector that is received first in time, so that there is no reference phase with which to make a measurement. As a result, the first received phase vector V1 will be chosen as the initial value of the reference vector Vr which is to be successively refined. The next received vector is the vector V2. As shown in FIG. 2, for BPSK modulation vector V2 may have one of two orientations (0° or 180°), represented by the vectors $V_{+2}$ and $V_{-2}$ projected from the end of vector V1 of FIG. 2. In accordance with the present invention, these two hypothetical vectors are individually summed with the reference vector Vr (=V1) to derive a new reference vector Vr', which will correspond to the vector sum of the original vector Vr (here Vr=V1) with either hypothetical vector $V_{+2}$ or $V_{-2}$, depending upon which vector sum produces the largest magnitude. As shown in FIG. 2, a first vector sum hypothesis H1 corresponds to the sum of vectors Vr and $V_{+2}$, while a second vector sum hypothesis H2 corresponds to the sum of Vr and $V_{-2}$. Since, as illustrated in FIG. 2, the vector sum of vectors V1 and $V_{+2}$ yields a hypothesis value H1 which is smaller in magnitude than hypothesis H2, the vector sum of vectors V1 and $V_{-2}$ is chosen as the new reference vector $V_r'$.

Figure 3:
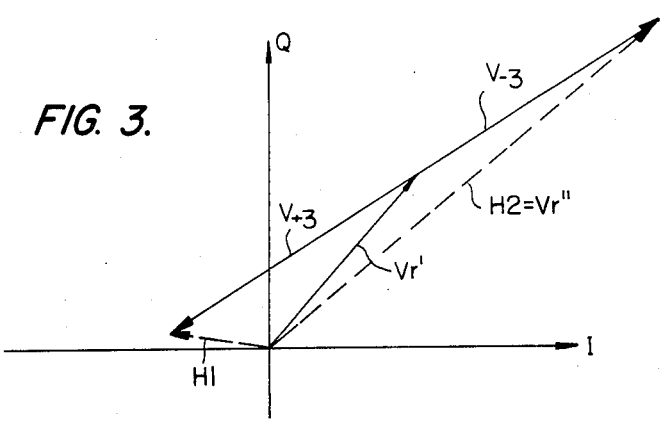

Given a new or "refined" reference vector $V_r'$, the above described procedure is carried out using the third received vector V3. As shown in FIG. 3, the magnitude of hypothesis H1 (the sum of $V_{+3}$ and $V_r'$) is considerably less than that of the magnitude of hypothesis H2 (the sum of vectors $V_{-3}$ and $V_r'$), so that the new reference vector $V_r''$ becomes the sum of reference vector $V_r'$ and hypothetical vector $V_{-3}$.

Figure 4:
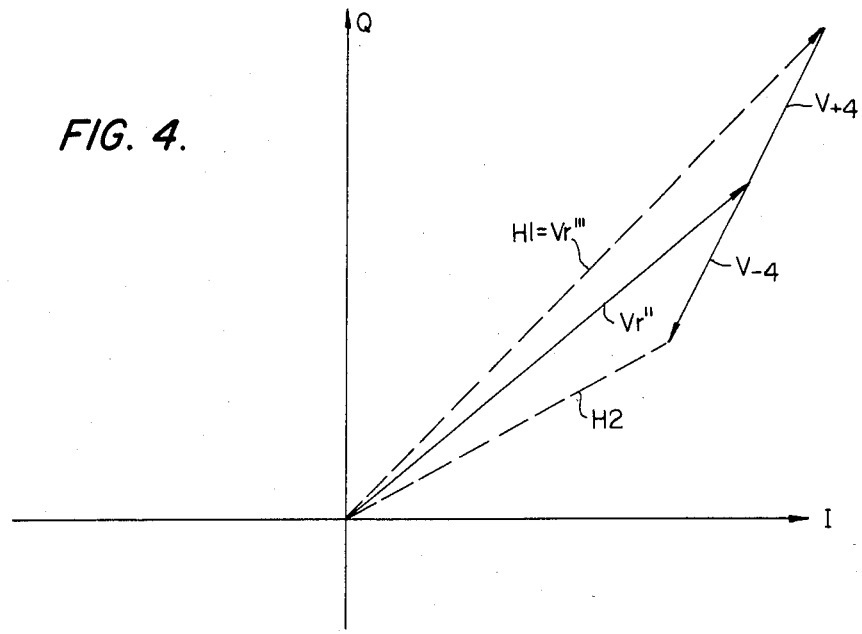

Finally, as shown in FIG. 4, for the fourth received phase vector V4, there are again two hypotheses H1 and H2 corresponding to the vector sums of the reference vector $V_r''$ and the two possible orientations of vector V4, identified as vectors $V_{+4}$ and $V_{-4}$. As shown in FIG. 4, hypothesis H1 produces the larger resultant magnitude, which is chosen as the reference vector $V_r'''$. Namely, the new reference vector $V_r'''$ is equal to the sum of the previous reference vector $V_r''$ and hypothetical vector $V_{+4}$.

Figure 5:
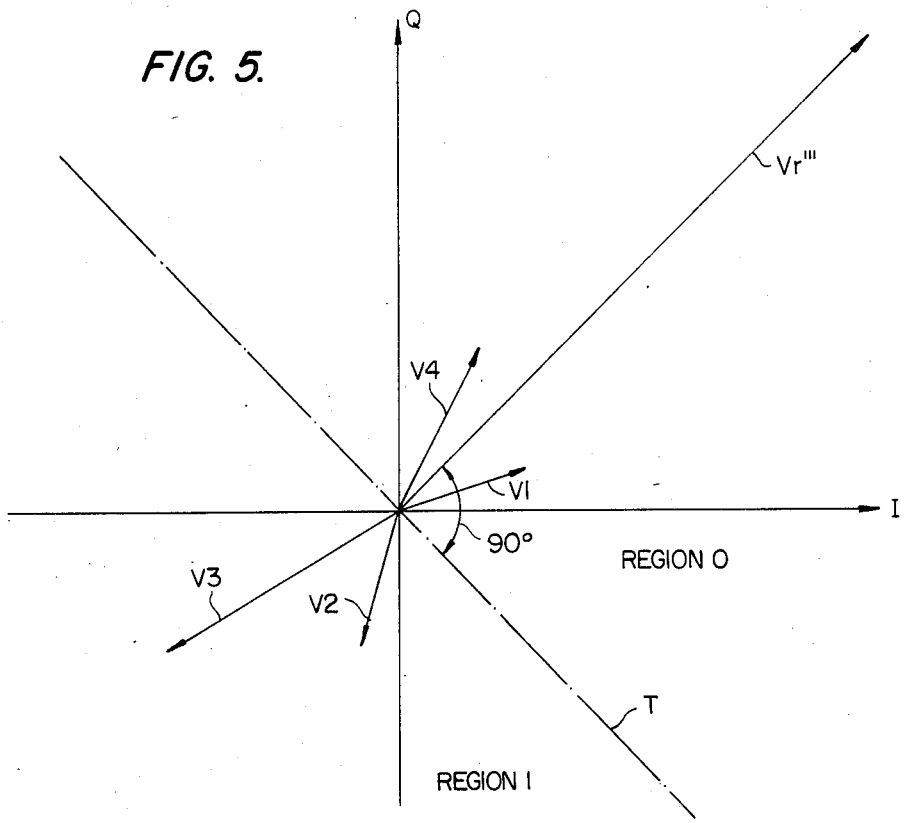

The position and magnitude of the reference vector $V_r'''$ relative to the originally received set of vectors of FIG. 1 is shown in FIG. 5. Also projected onto the Figure is a delineation line T between a set of regions 0 and 1, respectively associated with the two (binary) symbols capable of being represented by received vector. In effect, the delineation line T between the two regions is a threshold for determining whether a received vector represents a 0 or a 1 (binary PSK modulation). Thus, on the basis of reference vector $V_r'''$ vectors V1 and V4 are demodulated as 0s, and vectors $V_2$ and $V_3$ are demodulated as 1s.

Figure 6:
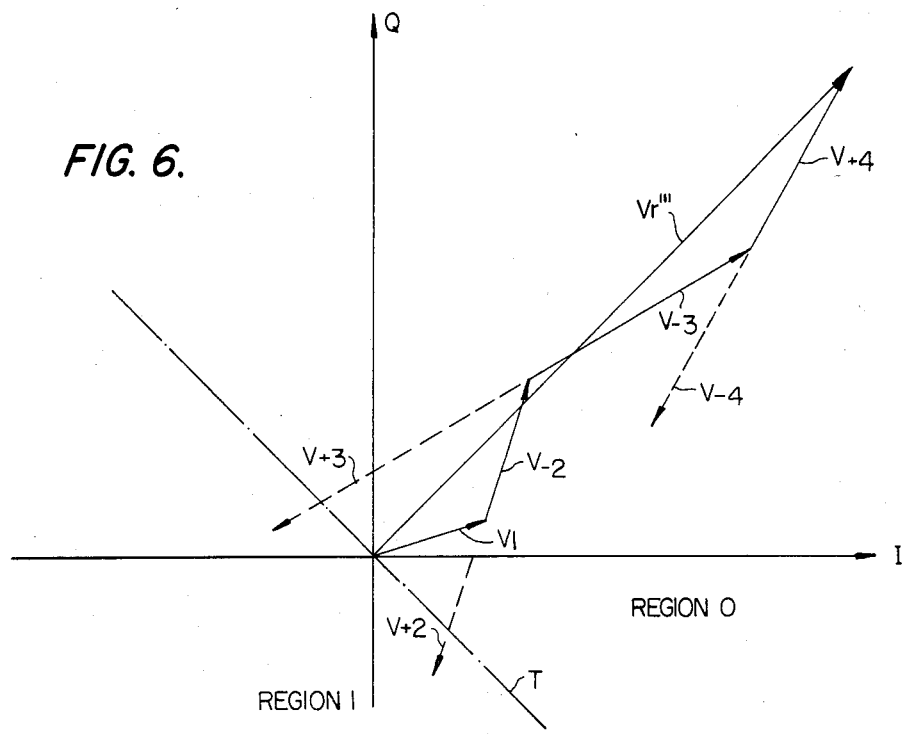

FIG. 6 shows an overall vector diagram illustrating the manner in which successively refined hypotheses eventually arrive at the resultant reference $Vr'''$ of FIG. 5. Of course, it should be observed that the reference vector $V_r'''$ only defines a threshold line T for demodulation between regions 0 and 1. The actual assignment of symbol numbers to the regions is arbitrary so that there is still a 0/180° phase ambiguity for binary PSK. As will be described below with reference to an exemplary embodiment of the present invention, shown in FIG. 7, the polarity of output data is preserved from burst-to-burst by the use of polarity (+1) control multipliers.

Referring now to FIG. 7, there is shown a schematic block diagram of a binary PSK reference vector generator and demodulator scheme for implementing the vector processing sequence discussed above in connection with the description of FIGS. 1-6. For the illustrated embodiment, it will be assumed that all of the components are implemented digitally, so that the respective lines intercoupling the respective processing elements of the circuit are associated with some significant bit resolution to which the demodulation process will be carried out. Moreover, it is assumed that there is a separate clock recovery circuit, an explanation of the details of which are unnecessary for an understanding of the present invention, through which the respective components of FIG. 7 are controlled. The clock recovery circuit is used in its conventional manner to clock the signals through the various elements of the system.

As shown in FIG. 7, input links 11I and 11Q are coupled to receive respective in-phase (I) and quadrature (Q) components of received BPSK signals. These I and Q components may be derived from integrate and dump circuits, or accumulate and reset circuits if implemented digitally. The form of the upstream processing circuitry is unimportant for an understanding of the present invention and will not be detailed here.

The in-phase line 11I is coupled as one input to each of a pair of multipliers 12I and 14I and to the first stage of an N-bit shift register 13I. Similarly, quadrature input line 11Q is coupled to one input of each of a pair of multipliers 12Q and 14Q and to the first stage of an N-bit shift register 13Q.

Each of shift registers 13I and 13Q is employed to temporarily buffer N successively received symbols during the refinement of the reference vector with respect to which the symbols are to be demodulated. The outputs of the shift registers are coupled to respective multipliers 21I and 21Q of the demodulator portion of the system, to be described below.

Multipliers 12I and 12Q form part of the circuitry for calculating the magnitudes of the vector sums of the respective hypothetical values that an input symbol may take and the reference vector. A determination of which hypothetical value should be selected is carried out by a comparator circuit 17 which is coupled to the outputs of Multipliers 12I and 12Q. The output of the comparator circuit supplies a +1 or a −1 to be multiplied in multipliers 14I and 14Q by the respective I and Q input components of a received symbol on lines 11I and 11Q. The output of each of multipliers 14I and 14Q represent properly oriented in-phase and quadrature components of the received symbol, which produce the largest vector sum when summed with the reference vector. These outputs are added to the reference vector, which is stored in accumulators 16I and 16Q, in adders 15I and 15Q and then the sum, in terms of each respective I and Q component, is coupled to accumulators 16I and 16Q to replace the previous reference values. A reset line 19 is coupled to each of accumulators 16I and 16Q to reset or clear the accumulators for a span of N-symbols.

The outputs of accumulators 16I and 16Q, which, as noted above, store the respective Ir and Qr components of the reference vector, are coupled to multipliers 18I and 23I and to multipliers 23Q and 18Q, respectively. The output of multipliers 18I and 18Q are coupled to respective registers 22I and 22Q. Registers 22I and 22Q store the refined I and Q components of the reference vector to be used to demodulate the symbols that have been successively clocked into shift registers 13I and 13Q.

Multipliers 23I and 23Q, which receive, as a second input, the Ir and Qr components of the reference vector as stored in registers 22I and 22Q, are used to insure proper orientation of the reference vectors for successively pluralities N of symbols. For this purpose, multipliers 23I and 23Q multiply the contents of the accumulators 16I and 16Q by the reference vectors stored in registers 22I and 22Q. The outputs of multipliers 23I and 23Q are coupled to a comparator 24, the output of which is coupled to supply a polarity control signal (+1 or −1) as one input to each of multipliers 18I and 18Q. In effect, multipliers 23I and 23Q and comparator 24 behave in the same manner as multipliers 12I and 12Q and comparator 17 to control the proper polarity of vector orientation.

The demodulator itself consists of registers 22I and 22Q in which the respective Ir and Qr components of the reference vector are stored for demodulation of the respective I and Q components of the successively received symbols stored in shift registers 13I and 13Q. Demodulation is effected by multiplying the respective components in multipliers 21I and 21Q by the reference vector components Ir and Qr, respectively, and coupling the multiplier outputs to a comparator 25. The output of comparator is coupled over line 26 and represents the binary value (0 or 1) of a demodulated symbol.

Considering now the operation of the reference vector generator and demodulator system of FIG. 7, it will be initially assumed that all storage registers (shift registers 13I and 13Q, accumulators 16I and 16Q, and reference vector registers 22I and 22Q) have been cleared. Moreover, to provide a practical example, the processing of the vectors V1–V4 shown in FIGS. 1-6, discussed above, will be explained. Thus, it will be assumed that the capacity of each of shift registers 13I and 13Q accommodates four successive symbols and that reset line 19 clears accumulators 16I and 16Q at the completion of processing of successive groups of four symbols.

As the first symbol V1 is received, its respective in-phase and quadrature components I1, Q1 are coupled over input links 11I and 11Q to one input of each of multipliers 12I and 12Q, to one input of each of multipliers 14I and 14Q, and to the first stage of each of shift registers 13I and 13Q, respectively. Since the contents of each of accumulators 16I and 16Q have been cleared, multipliers 12I and 12Q multiply the cleared contents (all zeros) by the respective values on links 11I and 11Q. The product of each multiplication corresponds to all zeros so that the inputs to comparator 17 are the same. As pointed out above, comparator 17 is used to control the polarity (sign) of the data values supplied over links 11I and 11Q, depending upon the orientation of the received vector, relative to the reference vector, whose respective Ir and Qr components are stored in accumulators 16I and 16Q. For the initially received symbol, with the contents of accumulators 16I and 16Q cleared and, correspondingly, the inputs to comparator 17 being all zeros, comparator 17 produces an output representative of a (+1) to be multiplied in multipliers 14I and 14Q by the respective in-phase and quadrature components of the first received vector V1. Simply put, because the first received vector is to be used as the initial value of the reference vector, as discussed above in conjunction with the description of FIG. 1, its values on links 11I and 11Q are unaltered by the action of multipliers 14I and 14Q. These values are applied to adders 15I and 15Q wherein they are added with the cleared contents of respective accumulators 16I and 16Q and then loaded into accumulators 16I and 16Q. Until all four vectors of the N-symbol span have been processed to refine the reference vector, the inputs of registers 22I and 22Q are disabled so that the contents of the accumulators 16I and 16Q are not loaded into registers 22I and 22Q. Of course, there is also no demodulation, since all four symbols to be processed in the course of refining the reference vector have not been clocked through respective shift registers 13I and 13Q.

As the next vector symbol V2 is received, it is processed in the same manner as the initial vector V1. Referring to FIG. 2, as pointed out above, for BPSK signalling, for which the generator/demodulator of FIG. 7 is particularly configured, for each received vector there are two hypothetical vectors from which respective vector sums are calculated to establish a new reference vector. As pointed out above, multipliers 12I and 12Q and comparator 17 perform this operation.

Figure 8:
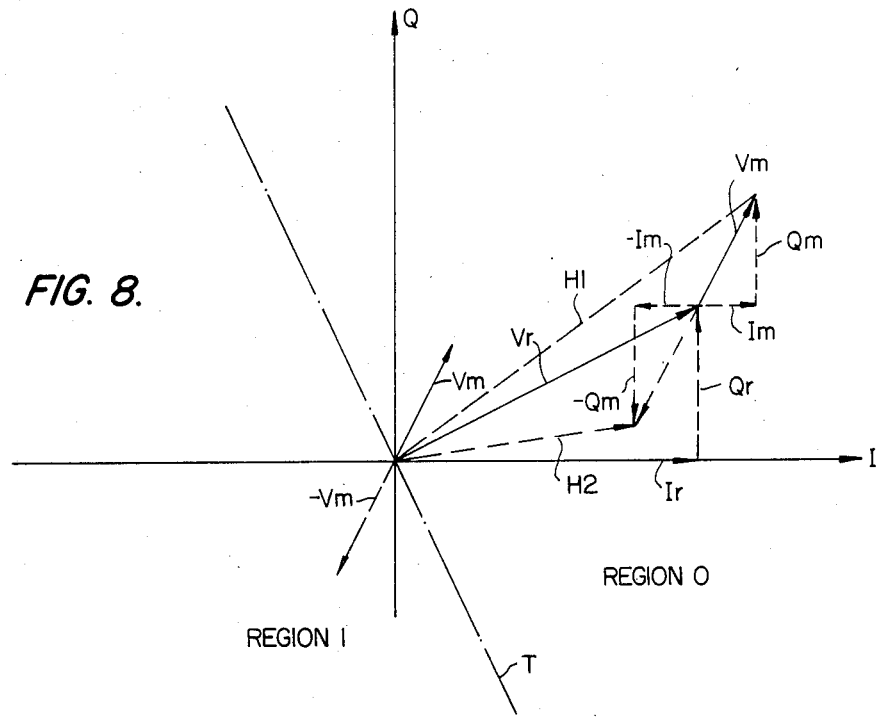
FIG. 8 is a vector diagram illustrating the vector sum testing process carried out in the BPSK demodulator of FIG. 7.

To illustrate the manner in which the multiplication and comparison operation performs the vector summation testing and selection processing, attention is directed to FIG. 8 which shows a vector diagram of a reference vector Vr and a received vector Vm. As pointed out previously, the received vector Vm may have one or two orientations. It may lie in the same region as the reference vector (shown as region zero in FIG. 8) or it may lie in the opposing region (as vector −Vm in region 1). The threshold line T is orthogonal to the direction of reference vector Vr and delineates the separation between regions 0 and 1 which prescribe whether a vector represents a binary 0 or a binary 1, in the BPSK modulation scheme of the present example. Assuming that the received vector Vm lies in the region 0, then the summation of its respective in-phase and quadrature components Im and Qm with the respective in-phase and quadrature components Ir and Qr of the reference vector produce a first vector sum having a magnitude $|H1|$. This magnitude may be expressed as:

$$|H1|^2 = (Ir+Im)^2 + (Qr+Qm)^2.$$

For the second hypothetical vector −Vm, the in-phase and quadrature components are oriented in a direction opposite to that of the first hypothetical orientation of vector Vm, so that they effectively subtract from the direction of orientation of the components Ir and Qr of the reference vector, as shown in FIG. 8. Thus, the magnitude of the second hypotheses may be denoted as:

$$|H2|^2 = (Ir-Im)^2 + (Qr-Qm)^2.$$

As can be seen from FIG. 8, where the hypothesis of the vector Vm lies in the same region (here region 0) has the reference vector Vr, the square of the magnitude of the vector sum of the first hypotheses is greater than that of the square of the magnitude of the vector sum of the second hypotheses, namely $$|H1|^2 > |H2|^2.$$

In this case, since the vector Vm has been determined to lie in the same region (region 0) as a reference vector Vr, the polarity of its respective components Im and Qm is unauthored, so that the polarity components are multiplied by the value +1.

On the other hand, where the received vector lies in a region (here region 1) opposite to that containing the reference vector $V_r$, then $$|H2|^2 > |H1|^2$$

and it is necessary to change to polarities of the respective in-phase and quadrature components Im,Qm. In other words, each of components Im,Qm needs to be multiplied by (−1).

When the expressions for the squares of the magnitudes of the hypotheses H1 and H2, set forth above, are compared with one another, all of the terms except the ImIr QrQm terms drop out, so that it is only necessary to compare the product terms IrIm and QrQm with one another. Thus, multipliers 12I and 12Q simply multiply the Ir and Qr components of accumulators 16I and 16Q by the Im and Qm components on input links 11I and 11Q, respectively. These product terms are compared in comparator 17 to provide an output making a polarity correction, where necessary, to insure that the hypothesis which produces the larger magnitude reference vector is chosen to refine the contents of the accumulators 16I and 16Q. Simply put, what is shown in FIGS. 2–4 for successive vectors V2, V3 and V4 is shown in general terms in FIG. 8 and is accomplished by multipliers 12I and 12Q, comparator 17, multipliers 14I and 14Q and adder circuits 15I, 15Q, which are coupled to accumulators 16I and 16Q.

Upon the completion of the above-described processing of each of the four symbols V1–V4, the contents of each of accumulators 16I and 16Q are coupled through multipliers 18I and 18Q and loaded into registers 22I and 22Q, respectively. As noted previously, the contents of registers 22I and 22Q are employed to demodulate the respective symbols V1–V4, whose in-phase and quadrature components I1-I4 and Q1-Q4 have been successively shifted through shift registers 13I and 13Q.

As pointed out above, in the process of coupling the contents of accumulators 16I and 16Q into reference vector registers 22I and 22Q, it necessary to insure that the direction of the finally decided upon reference vector is properly oriented with respect to the reference vector that was employed for a previous in-plurality of symbols, in order that the same binary reference will be employed for data demodulation for successively received symbols. In other words, for each set of N-symbols, one may not arbitrarily decide upon what vector direction will be referenced as a 1 and what reference direction will be chosen as a 0; continuity between successive sets of symbols is required. For this purpose, multipliers 18I and 18Q selectively modify the polarity of the reference vector components that are coupled from the accumulators 16I and 16Q into registers 22I and 22Q. In essence, the same multiplication and comparison process carried out by multipliers 12I, 12Q and comparator 17, together with multipliers 14I and 14Q, and discussed above in conjunction with FIG. 8 is carried out by multipliers 23I and 23Q, comparator 24, and multipliers 18I and 18Q. Simply put, once it has been determined in which region a reference vector lies, from an initially processed set of symbols, and that region has been designated as one of two binary values for demodulation, that binary designation must be maintained to insure continuity of demodulation. In other words, at the transmitter, the reference vector certainly does not flip directions and the use of the above described multipliers and polarity control circuit prevents this from happening at the receiver.

Finally, demodulation is carried out by multiplying each of the received symbols (in terms of their respective in-phase and quadrature components stored in shift registers 13I and 13Q) by the reference vector components Ir, Qr stored in reference vector registers 22I and 22Q through the use of multipliers 22I and 22Q. The output of comparator 25, which is coupled to multipliers 21I and 21Q, provides a 0 or a 1, indicating in which region relative to the threshold line T, as shown in FIGS. 5, 6 and 8, a received symbol lies. For example, referring again to FIG. 8, if the received symbol Vm lies in region 0, namely the same region where the reference vector Vr lies, the magnitude of the vector sum produced by the summation of the respective in-phase and quadrature components of the two vectors will be greater than that had the vector been oriented in the opposite direction and lie in region 1. Thus, the output of comparator 25 will be a 0 where the vector lies in the same region as the reference vector but will be a 1 when the vector lies in the opposite region.

In place of using a threshold scheme as discussed above, it is also possible to phase shift the value of each received vector, as it is stored in memory (for example the N symbol shift registers 13I and 13Q) by some phase shift ($-\phi r$), $\phi$ being the phase of the reference vector. The resultant phases obtained are then compared with a set of fixed phase thresholds, the values of which depend only upon the magnitude of M.

In other words, $$I_n = I_i \cos(-\phi r) - Q_i \sin(-\phi r)$$

$$= I_i \cos(\phi r) + Q_i \sin(\phi r), \text{ and}$$

$$Q_n = I_i \sin(-\phi r) + Q_i \cos(-\phi r)$$

-continued $$= Q_i \cos(\phi r) - I_i \sin(\phi r),$$

where $I_i$, $Q_i$ the $i^{th}$ vector from memory, and $I_n$, $Q_n$ are $I_i$, $Q_i$ phase-shifted by $-\phi r$ radians. Still, the reference vector generation scheme is the same as that for the threshold demodulation process.

In the foregoing example, a set of N=4 symbols was employed for purposes of providing an exemplary illustration. In actual performance tests, for a set of symbols N=8, the symbol error rate performance was degraded by 0.6 db at EsNo=0 and 0.1 db at Es/No=3. For a much larger set of symbols, N=99, performance was degraded by 0.1 db at EsNo=0. Performance has been determined also to be dependent on the carrier frequency offset during an N-bit message. For the BPSK example described above, reasonably good performance can be expected for frequency offsets less than the symbol rate divided by 20 times N, where N is the number of symbols over which the reference vector is measured. This corresponds to a phase shift during the N symbol message of about 20° due to doppler shift. Of course, the actual degradation can be simulated for expected conditions.

Advantageously, because the present invention operates on the actually received absolute values of phase vectors to determine the actual reference vector to be used in the demodulation process for those phase vectors, offset dependencies of the actual values being demodulated are accounted for. Moreover, the present invention operates on either bursts or continuous signal formats so that loss of data, which is a significant problem in-phase lock-loop recovery systems, is effectively obviated.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in a demodulator for detecting information signals which have been encoded in the form of M-ary phase shift keying signals, a method of generating a reference phase signal through the use of which information signals are recovered from received M-ary phase shift keying signals comprising the steps of:
   (a) for a respective one of a plurality of received M-ary PSK signals, generating M respective vector sum signals respectively representative of the vector sums of a reference phase vector signal and each of M prescribed phase vectors referenced relative to said respective one of a plurality of received M-ary PSK signals;
   (b) replacing said reference phase vector signal with that one of the vector sum signals generated in step (a) whose magnitude is largest; and
   (c) repeating steps (a) and (b) for a prescribed number N of received M-ary PSK signals to derive a reference phase vector signal that has been refined over said prescribed number N of received signals; whereby
   upon completion of steps (a)-(c), the refined reference phase vector signal corresponds to said reference phase signal through the use of which information signals encoded in the form of M-ary PSK signals are recovered.

2. A method according to claim 1, wherein said M prescribed phase vectors correspond to the M possible phase vectors to which said respective received signal may correspond in accordance with its M-ary PSK modulation relative to the absolute phase thereof.

3. A method according to claim 1, wherein said M-ary phase shift keying signals are binary phase shift keying signals.

4. A method according to claim 3, wherein said M prescribed phase vectors represent the M possible phase vectors to which said respective received signal may correspond in accordance with its M-ary PSK modulation relative to the absolute phase thereof.

5. A method according to claim 4, wherein said step (a) comprises multiplying the respective in-phase and quadrature components of said reference phase vector signal by the respective in-phase and quadrature components of said respective received signal to derive a pair of respective vector sum representation signals.

6. A method according to claim 5, wherein said step (b) comprises the steps of
 (b-1) selectively modifying the in-phase and quadrature components of said respective received signal in accordance with which of said pairs of respective vector sum signals has the larger magnitude, and
 (b-2) adding the respective in-phase and quadrature components of said respective received signal as selectively modified in step (b-1) to the respective in-phase and quadrature components of said reference phase vector signal.

7. A method according to claim 6, wherein said step (b-1) comprises the step of selectively reversing the polarity of the in-phase and quadrature components of said respective received signal in accordance with which of said pair of respective vector signals has the larger magnitude.

8. A method of demodulating information signals which have been encoded in the form of M-ary phase shift keying signals comprising the steps of:
 (a) for a respective one of a plurality of received M-ary PSK signals, generating M respective vector sum signals respectively representative of the vector sums of a reference phase vector signal and each of M prescribed phase vectors referenced relative to said respective one of a plurality of received M-ary PSK signals;
 (b) replacing said reference phase vector signal with that one of the vector sum signals generated in step (a) whose magnitude is largest;
 (c) repeating steps (a) and (b) for a prescribed number of N of received M-ary PSK signals to derive a reference phase vector signal that has been refined over said prescribed number N of received signals; and
 (d) combining the refined reference phase vector signal derived in step (c) with received M-ary PSK signals so as to recover information contained therein.

9. A method according to claim 8, wherein said M prescribed phase vectors represent the M possible phase vectors to which said respective received signal may correspond in accordance with its M-ary PSK modulation relative to the absolute phase thereof.

10. A method according to claim 8, wherein said M-ary phase shift keying signals are binary phase shift keying signals.

11. A method according to claim 10, wherein said M prescribed phase vectors represent the M possible phase vectors to which said respective received signal may correspond in accordance with its M-ary PSK modulation relative to the absolute phase thereof.

12. A method according to claim 11, wherein said step (a) comprises multiplying the respective in-phase and quadrature components of said reference phase vector signal by the respective in-phase and quadrature components of said respective received signal to derive a pair of respective vector sum representation signals.

13. A method according to claim 12, wherein said step (b) comprises the steps of
 (b-1) selectively modifying the in-phase and quadrature components of said respective received signal in accordance with which of said pairs of respective vector sum signals has the larger magnitude, and
 (b-2) adding the respective in-phase and quadrature components of said respective received signal as selectively modified in step (b-1) to the respective in-phase and quadrature components of said reference phase vector signal.

14. A method according to claim 13, wherein said step (b-1) comprises the step of selectively reversing the polarity of the in-phase and quadrature components of said respective received signal in accordance with which of said pair of respective vector signals has the larger magnitude.

15. A method according to claim 8, further including the step of
 (e) storing the respective in-phase and quadrature components of received M-ary PSK signals, and
 step (d) comprises multiplying the respective in-phase and quadrature components of said refined reference phase vector signal by the respective in-phase and quadrature components of received signals to derive, for each received signal, a pair of component product signals, and comparing said component product signals to one another to recover the information contained in the received signals.

16. A method according to claim 8, wherein step (d) further comprises selectively modifying said refined reference phase vector signal derived in step (c) in accordance with a prescribed relationship between said refined reference phase vector signal and the refined reference phase vector signal derived for a previous number of received M-ary PSK signals, and combining the selectively modified refined reference phase vector signal with received M-ary PSK signals so as to recover information contained therein.

17. A method according to claim 16, further including the step of
 (e) storing the respective in-phase and quadrature components of received M-ary PSK signals, and
 step (d) comprises multiplying the respective in-phase and quadrature components of said selectively modified, refined reference phase vector signal by the respective in-phase and quadrature components of received signals to derive, for each received signal, a pair of component product signals, and comparing said component product signals to one another to recover the information contained in the received signals.

18. A method according to claim 17, wherein said M-ary phase shift keying signals are binary phase shift keying signals.

19. A method according to claim 18, wherein said M prescribed phase vectors represent the M possible phase vectors to which said respective received signal may correspond in accordance with its M-ary PSK modulation relative to the absolute phase thereof.

20. A method according to claim 19, wherein said step (a) comprises multiplying the respective in-phase and quadrature components of said reference phase vector signal by the respective in-phase and quadrature components of said respective received signal to derive a pair of respective vector sum representation signals.

21. A method according to claim 20, wherein said step (b) comprises the steps of
   (b-1) selectively modifying the in-phase and quadrature components of said respective received signal in accordance with which of said pairs of respective vector sum signals has the larger magnitude, and
   (b-2) adding the respective in-phase and quadrature components of said respective received signal as selectively modified in step (b-1) to the respective in-phase and quadrature components of said reference phase vector signal.

22. For use in a demodulator for detecting information signals which have been encoded in the form of M-ary phase shift keying signals, a method of generating a reference phase signal through the use of which information signals are recovered from a plurality of N received M-ary phase shift keying signals comprising the steps of:
   (a) storing, as an initial version of a reference phase vector signal, one of said plurality of N received M-ary signals;
   (b) for a respective other of said plurality N of received M-ary signals, generating M respective vector sum signals respectively representative of the vector sums of said reference phase vector signal and each of M prescribed phase vectors referenced relative to said respective other of said plurality N of received M-ary signals;
   (c) replacing said reference phase vector signal with that one of the vector sum signals generated in step (a) whose magnitude is largest; and
   (d) repeating steps (b) and (c) for the remainder of said plurality N of received M-ary PSK signals to derive a reference vector signal that has been refined over the remainder of said plurality N of received signals; whereby
   upon completion of steps (a)–(d), the refined reference phase vector signal corresponds to the reference phase signal through the use of which information signals contained in said N plurality of received signals encoded in the form of M-ary PSK signals are recovered.

23. A method according to claim 22, wherein said M prescribed phase vectors represent the M possible phase vectors to which said respective received signal may correspond in accordance with its M-ary PSK modulation relative to the absolute phase thereof.

24. A method according to claim 23, wherein said M-ary phase shift keying signals are binary phase shift keying signals.

25. A method according to claim 23, wherein said method further comprises demodulating said received M-ary phase shift keying signals by the step of
   (e) combining the refined reference phase vector signal derived in step (d) with each of said plurality N of received M-ary PSK signals so as to recover information contained therein.

26. A method according to claim 25, further including the step of
   (f) storing the respective in-phase and quadrature components of received M-ary PSK signals, and
   step (e) comprises multiplying the respective in-phase and quadrature components of said refined reference phase vector signal by the respective in-phase and quadrature components of received signals to derive, for each received signal, a pair of component product signals, and comparing said component product signals to one another to recover the information contained in the received signals.

27. A method according to claim 25, wherein step (e) further comprises selectively modifying said refined reference phase vector signal derived in step (d) in accordance with a prescribed relationship between said refined reference phase vector signal and the refined reference phase vector signal derived for a previous number of received M-ary PSK signals, and combining the selectively modified refined reference phase vector signal with received M-ary PSK signals so as to receive information contained therein.

28. A method according to claim 27, further including the step of
   (g) storing the respective in-phase and quadrature components of received M-ary PSK signals, and
   step (e) comprises multiplying the respective in-phase and quadrature components of said selectively modified, refined reference phase vector signal by the respective in-phase and quadrature components of received signals to derive, for each received signal, a pair of component product signals, and comparing said component product signal to one another to recover the information contained in the received signals.

29. A method according to claim 28, wherein said M-ary phase shift keying signals are binary phase shift keying signals.

30. For use in a demodulator for detecting information signals which have been encoded in the form of M-ary phase shift keying signals, an arrangement for generating a reference phase signal through the use of which information signals are recovered from received M-ary phase shift keying signals comprising:
   first means for generating, for each respective one of a plurality N of received M-ary PSK signals, M respective vector sum signals respectively representative of the vector sums of a reference phase vector signal and each of M prescribed phase vectors referenced relative to said respective one of a plurality of received M-ary PSK signals; and
   second means, coupled to said first means, for replacing said reference phase vector signal with that one of the vector sum signals generated by said first means whose magnitude is largest; whereby
   upon said second means having replaced said reference phase vector signal for the Nth one of said plurality N of received M-ary PSK signals there is obtained a refined reference phase vector signal corresponding to said reference phase signal through the use of which information signals encoded in the form of M-ary PSK signals are recovered.

31. An arrangement according to claim 30, wherein said M prescribed phase vectors correspond to the M possible phase vectors to which said respective received signal may correspond in accordance with its M-ary PSK modulation relative to the absolute phase thereof.

32. An arrangement according to claim 31, wherein said M-ary phase shift keying signals are binary phase shift keying signals.

33. An arrangement according to claim 32, wherein said M prescribed phase vectors represent the M possible phase vectors to which said respective received signal may correspond in accordance with its M-ary PSK modulation relative to the absolute phase thereof.

34. An arrangement according to claim 33, wherein said first means comprises means for multiplying the respective in-phase and quadrature components of said reference phase vector signal by the respective in-phase and quadrature components of said respective received signal to derive a pair of respective vector sum representation signals.

35. An arrangement according to claim 34, wherein said second means comprises means for selectively modifying the in-phase and quadrature components of said respective received signal in accordance with which of said pairs of respective vector sum signals has the larger magnitude, and means for adding the respective in-phase and quadrature components of said respective received signal as selectively modified by said modifying means to the respective in-phase and quadrature components of said reference phase vector signal.

36. An arrangement according to claim 35, wherein said second means further comprises means for selectively reversing the polarity of the in-phase and quadrature components of said respective received signal in accordance with which of said pair of respective vector signals has the larger magnitude.

37. An apparatus for demodulating information signals which have been encoded in the form of M-ary phase shift keying signals comprising:
first means for generating, for each respective one of of plurality N of received M-ary PSK signals, M respective vector sum signals respectively representative of the vector sums of a reference phase vector signal and each of M prescribed phase vectors referenced relative to said respective one of a plurality N of received M-ary PSK signals;
second means, coupled to said first means, for replacing said reference phase vector signal with that one of the vector sum signals generated by said first means whose magnitude is largest, whereby, upon said second means having replaced said reference vector signal for the Nth one of said plurality N of received M-ary PSK signals there is obtained a reference phase vector signal that has been refined over said prescribed N of received signals; and
third means, coupled to said second means and coupled to receive said plurality N of received signals, for combining the refined reference phase vector signal derived by said second means with said plurality N of received M-ary PSK signals so as to recover information contained therein.

38. An apparatus according to claim 37, wherein said M prescribed phase vectors represent the M possible phase vectors to which said respective received signal may correspond in accordance with its M-ary PSK modulation relative to the absolute phase thereof.

39. An apparatus according to claim 38, wherein said M-ary phase shift keying signals are binary phase shift keying signals.

40. An apparatus according to claim 37, further including fourth means storing the respective in-phase and quadrature components of received M-ary PSK signals, and wherein
said third means comprises means for multiplying the respective in-phase and quadrature components of said refined reference phase vector signal by the respective in-phase and quadrature components of received signals to derive, for each received signal, a pair of component product signals, and comparing said component product signals to one another to recover the information contained in the received signals.

41. An apparatus according to claim 37, wherein said third means further comprises means for selectively modifying said refined reference phase vector signal derived by said second means in accordance with a prescribed relationship between said refined reference phase vector signal and the refined reference phase vector signal derived for a previous number of received M-ary PSK signals, and means for combining the selectively modified refined reference phase vector signal with received M-ary PSK signals so as to recover information contained therein.

42. For use in a demodulator for detecting information signals which have been encoded in the form of M-ary phase shift keying signals, an arrangement for generating a reference phase signal through the use of which information signals are recovered from a plurality of N received M-ary phase shift keying signals comprising:
first means for storing, as an initial version of a reference phase vector signal, one of said plurality of N received M-ary signals;
second means, coupled to said first means, for generating, for a respective other of said plurality N of received M-ary signals, M respective vector sum signals respectively representative of the vector sums of said reference phase vector signal and each of M prescribed phase vectors referenced relative to said respective other of said plurality N of received M-ary signals; and
third means, coupled to said first and second means, for replacing said reference phase vector signal stored by said first means with that one of the vector sum signals generated by said second means whose magnitude is largest, whereby, upon said third means having replaced said reference phase vector signal for the Nth one of said plurality N of received M-ary PSK signals, there is obtained a reference vector signal that has been refined over the remainder of said plurality N of received signals to the reference phase signal through the use of which information signals contained in said N plurality of received signals encoded in the form of M-ary PSK signals are recovered.

43. An arrangement according to claim 42, wherein said M prescribed phase vectors represent the M possible phase vectors to which said respective received signal may correspond in accordance with its M-ary PSK modulation relative to the absolute phase thereof.

44. An arrangement according to claim 43, wherein said M-ary phase shift keying signals are binary phase shift keying signals.

45. A arrangement according to claim 42, wherein said arrangement further comprises means for demodulating said received M-ary phase shift keying signals comprising fourth means, coupled to said third means and coupled to receive said plurality N received M-ary PSK signals, for combining the refined reference phase vector signal derived by said third means with each of said plurality N of received M-ary PSK signals, so as to recover information contained therein.

* * * * *